US012639728B1

(12) United States Patent　(10) Patent No.:　US 12,639,728 B1

Ioannidis et al.　(45) Date of Patent:　May 26, 2026

(54) MACHINE LEARNING TECHNIQUES FOR CONTENT DELIVERY SERVICE

(71) Applicant: Amazon Technologies, Inc., Seattle, WA (US)

(72) Inventors: Ioannis Ioannidis, Boulder, CO (US); Anton Dmitriyevich Postnov, Boulder, CO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/972,549

(22) Filed: Dec. 6, 2024

(51) Int. Cl.
　*G06Q 30/0251*　(2023.01)
　*G06Q 30/08*　(2012.01)

(52) U.S. Cl.
　CPC ......... *G06Q 30/0263* (2013.01); *G06Q 30/08* (2013.01)

(58) Field of Classification Search
　None
　See application file for complete search history.

(56) References Cited

U.S. PATENT DOCUMENTS

| | | | |
|---|---|---|---|
| 10,223,742 B2* | 3/2019 | Arora ..................... | G06Q 30/08 |
| 11,361,239 B2* | 6/2022 | R ........................ | G06Q 30/0201 |
| 2023/0004669 A1* | 1/2023 | Langseth .............. | G06F 16/258 |
| 2023/0259575 A1* | 8/2023 | Hamedi ................ | H04L 67/146 |
| | | | 709/219 |
| 2023/0351247 A1* | 11/2023 | Chen ................... | H04W 12/033 |

* cited by examiner

*Primary Examiner* — Allan J Woodworth, II
(74) *Attorney, Agent, or Firm* — Davis Wright Tremaine LLP

(57)　ABSTRACT

A system is disclosed to host a first machine learning model and a second machine learning model, where the first machine learning model is trained using a first privacy-compliant dataset, and the second machine learning model is trained using a second privacy-compliant dataset. The system is to obtain a digital content request that includes a dataset including user data and digital content data. The dataset is processed using the first machine learning model to generate a first score representing a probability of a user engaging with digital content and using the second machine learning model to generate a second score representing a similar probability. Based on one or both of these scores, the system selects at least one digital content from a plurality of digital content.

20 Claims, 6 Drawing Sheets

108

```
                    ┌─────────────────────────┐
                    │  Digital Content Request │
                    │           122           │
                    └─────────────────────────┘

{
  "id": "abc12345",  200 Unique identifier for the digital content request
  "placement": [  202 Array of placement objects
    {
      "id": "1",  204 Unique ID for this impression
      "banner": {  206 Banner digital content details
        "w": 300,
        "h": 250,
        "pos": 1
      },
    }
  ],
  "site": {  220 Information about the website or app
    "id": "site5678",  222 Unique site ID
    "name": "Example News",  224 Site name
    "domain": "example.com",  226 Domain name of the site
    "page": "https://example.com/articles/technology-news",  228 URL of the page
    "keywords": ["technology", "AI", "machine learning"]  232 Contextual keywords
  },
  "device": {  234 User device details
    "ua": "Mozilla/5.0 (iPhone; CPU iPhone OS 15_0 like Mac OS X) AppleWebKit/
605.1.15 (KHTML, like Gecko) Mobile/15E148",  236 User-Agent string
    "ip": "192.168.1.100",  238 IP address of the device
    "geo": {  240 Geolocation information
      "lat": 37.7749,  242 Latitude
      "lon": -122.4194,  244 Longitude
      "country": "USA",  246 Country code
      "region": "CA",  248 Region/state code
      "city": "San Francisco"  250 City name
    },
    "os": "iOS",  252 Operating system
    "osv": "15.0",  254 OS version
    "device_type": "mobile",  256 Type of device
    "model": "iPhone 13"  258 Device model
  },
  "user": {  260 User-related information ...
  }
}
```

FIG. 2

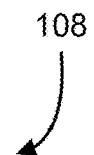

108

Client ML
Model 116

Service ML
Model 118

Request Module
110

```
{
  "user_id": "U12345",
  "context": {                          300
    "device": "mobile",
    "location": "New York, USA",
    "time_of_day": "morning",
    "app_category": "Fitness"
  },
  "propensity_scores": {
    "click": 0.90,
    "conversion": 0.50,
    "engagement": 0.85
  },
  "recommended_bid": 3.00
}
```

```
{
  "user_id": "U12345",
  "context": {                          302
    "device": "mobile",
    "location": "New York, USA",
    "app_category": "Fitness",
    "time_of_day": "morning"
  },
  "propensity_scores": {
    "click": 0.87,
    "conversion": 0.42,
    "engagement": 0.75
  },
  "recommended_bid": 2.50
}
```

FIG. 3

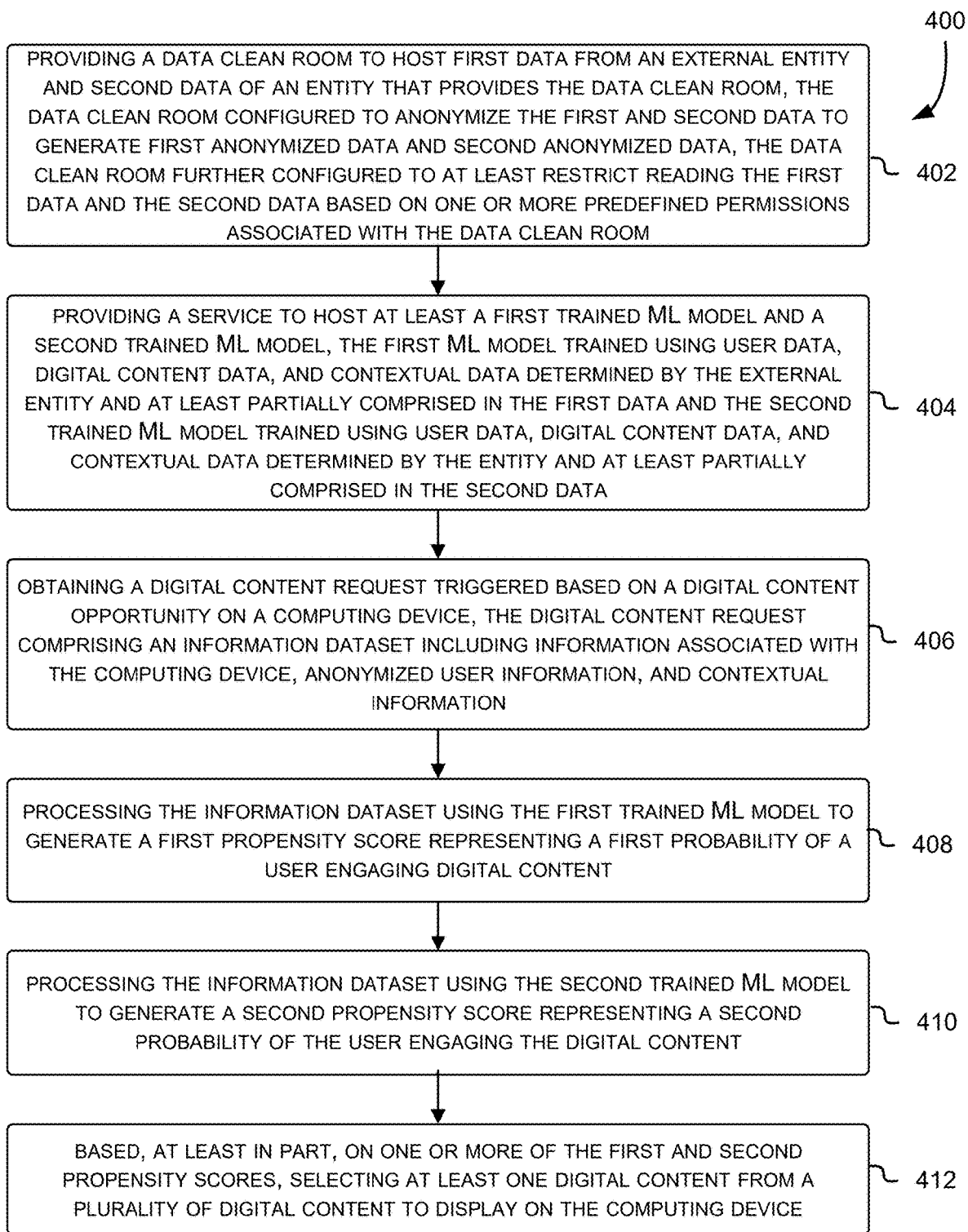

400

PROVIDING A DATA CLEAN ROOM TO HOST FIRST DATA FROM AN EXTERNAL ENTITY AND SECOND DATA OF AN ENTITY THAT PROVIDES THE DATA CLEAN ROOM, THE DATA CLEAN ROOM CONFIGURED TO ANONYMIZE THE FIRST AND SECOND DATA TO GENERATE FIRST ANONYMIZED DATA AND SECOND ANONYMIZED DATA, THE DATA CLEAN ROOM FURTHER CONFIGURED TO AT LEAST RESTRICT READING THE FIRST DATA AND THE SECOND DATA BASED ON ONE OR MORE PREDEFINED PERMISSIONS ASSOCIATED WITH THE DATA CLEAN ROOM — 402

PROVIDING A SERVICE TO HOST AT LEAST A FIRST TRAINED ML MODEL AND A SECOND TRAINED ML MODEL, THE FIRST ML MODEL TRAINED USING USER DATA, DIGITAL CONTENT DATA, AND CONTEXTUAL DATA DETERMINED BY THE EXTERNAL ENTITY AND AT LEAST PARTIALLY COMPRISED IN THE FIRST DATA AND THE SECOND TRAINED ML MODEL TRAINED USING USER DATA, DIGITAL CONTENT DATA, AND CONTEXTUAL DATA DETERMINED BY THE ENTITY AND AT LEAST PARTIALLY COMPRISED IN THE SECOND DATA — 404

OBTAINING A DIGITAL CONTENT REQUEST TRIGGERED BASED ON A DIGITAL CONTENT OPPORTUNITY ON A COMPUTING DEVICE, THE DIGITAL CONTENT REQUEST COMPRISING AN INFORMATION DATASET INCLUDING INFORMATION ASSOCIATED WITH THE COMPUTING DEVICE, ANONYMIZED USER INFORMATION, AND CONTEXTUAL INFORMATION — 406

PROCESSING THE INFORMATION DATASET USING THE FIRST TRAINED ML MODEL TO GENERATE A FIRST PROPENSITY SCORE REPRESENTING A FIRST PROBABILITY OF A USER ENGAGING DIGITAL CONTENT — 408

PROCESSING THE INFORMATION DATASET USING THE SECOND TRAINED ML MODEL TO GENERATE A SECOND PROPENSITY SCORE REPRESENTING A SECOND PROBABILITY OF THE USER ENGAGING THE DIGITAL CONTENT — 410

BASED, AT LEAST IN PART, ON ONE OR MORE OF THE FIRST AND SECOND PROPENSITY SCORES, SELECTING AT LEAST ONE DIGITAL CONTENT FROM A PLURALITY OF DIGITAL CONTENT TO DISPLAY ON THE COMPUTING DEVICE — 412

FIG. 4

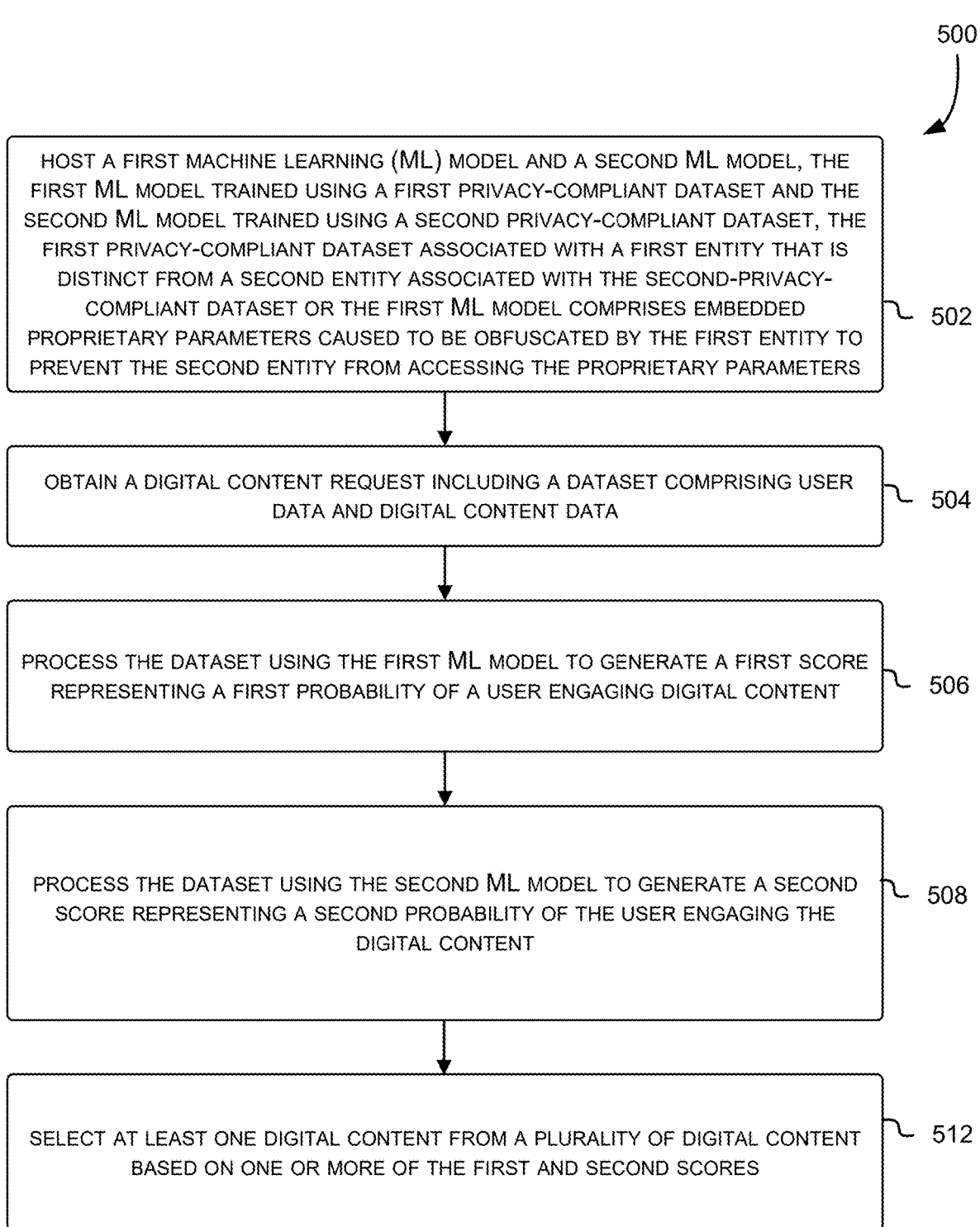

500

HOST A FIRST MACHINE LEARNING (ML) MODEL AND A SECOND ML MODEL, THE FIRST ML MODEL TRAINED USING A FIRST PRIVACY-COMPLIANT DATASET AND THE SECOND ML MODEL TRAINED USING A SECOND PRIVACY-COMPLIANT DATASET, THE FIRST PRIVACY-COMPLIANT DATASET ASSOCIATED WITH A FIRST ENTITY THAT IS DISTINCT FROM A SECOND ENTITY ASSOCIATED WITH THE SECOND-PRIVACY-COMPLIANT DATASET OR THE FIRST ML MODEL COMPRISES EMBEDDED PROPRIETARY PARAMETERS CAUSED TO BE OBFUSCATED BY THE FIRST ENTITY TO PREVENT THE SECOND ENTITY FROM ACCESSING THE PROPRIETARY PARAMETERS — 502

OBTAIN A DIGITAL CONTENT REQUEST INCLUDING A DATASET COMPRISING USER DATA AND DIGITAL CONTENT DATA — 504

PROCESS THE DATASET USING THE FIRST ML MODEL TO GENERATE A FIRST SCORE REPRESENTING A FIRST PROBABILITY OF A USER ENGAGING DIGITAL CONTENT — 506

PROCESS THE DATASET USING THE SECOND ML MODEL TO GENERATE A SECOND SCORE REPRESENTING A SECOND PROBABILITY OF THE USER ENGAGING THE DIGITAL CONTENT — 508

SELECT AT LEAST ONE DIGITAL CONTENT FROM A PLURALITY OF DIGITAL CONTENT BASED ON ONE OR MORE OF THE FIRST AND SECOND SCORES — 512

FIG. 5

MACHINE LEARNING TECHNIQUES FOR CONTENT DELIVERY SERVICE

BACKGROUND

A request for placing digital content in response to a digital content opportunity can involve a real-time auction conducted through a programmatic digital content ecosystem. When a user visits a website or application, a digital content request is generated by a publisher's supply-side service and sent to a digital content exchange, which forwards it to a demand-side service. The demand-side service evaluates the opportunity based on targeting criteria, user relevance, and campaign goals to estimate the likelihood of user engagement. If the opportunity aligns with a client's objectives, a bid is submitted with a specified price and digital content. The digital content exchange conducts an auction, and the highest or most relevant bid wins, depending on the auction type. The winning digital content is then delivered to the user's screen almost instantly, while performance metrics such as clicks or conversions are logged for future optimization. The request process for placing digital content can be improved.

BRIEF DESCRIPTION OF THE DRAWINGS

Various techniques will be described with reference to the drawings, in which:

FIG. 2 illustrates an example formatting for a digital content request;

FIG. 3 illustrates example propensity scores output by the bidder module of the cloud-based digital content service;

FIG. 4 illustrates a flow diagram including various processing acts, implemented by a system environment with one or more computing devices, which provide bid generation and digital content selection based on a plurality of ML models to generate propensity scores;

FIG. 5 illustrates another flow diagram including various processing acts, implemented by a system environment with one or more computing devices, which provide bid generation and digital content selection based on a plurality of ML models to generate propensity scores.

DETAILED DESCRIPTION

Figure 1:
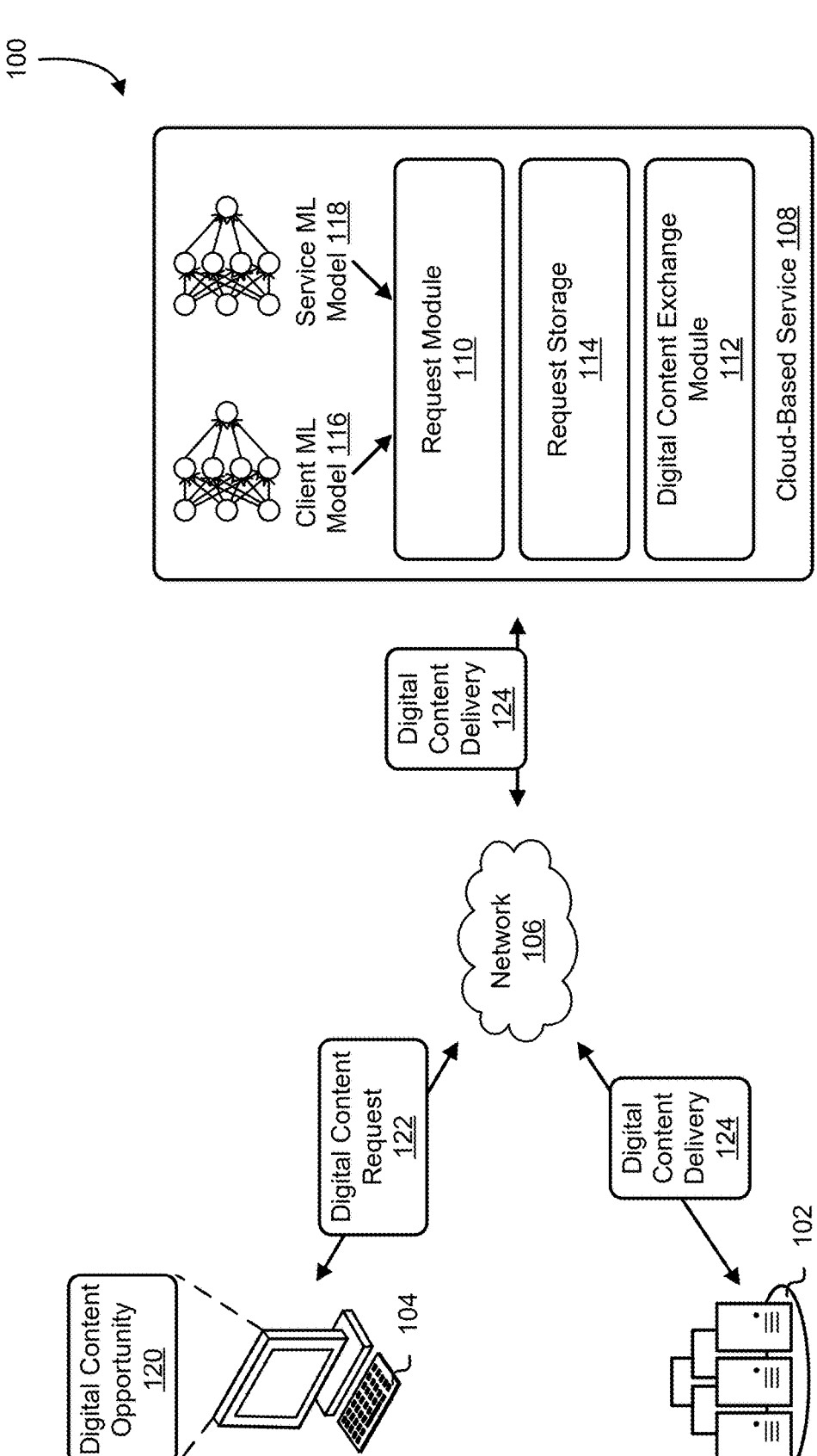
FIG. 1 illustrates a computer-implemented environment including one or more machine learning (ML) models to facilitate selection of a digital content request for a digital content opportunity.

The described systems and techniques integrate machine learning (ML) models and real-time data processing to improve digital content selection (e.g., selection) and delivery in a programmatic digital content environment. The system can be powered by one or more processors executing instructions stored in memory to handle data from multiple entities, process it through separate ML models, and make informed digital content placement decisions based on generated probabilities.

The system is designed to host multiple distinct ML models, each trained on separate privacy-compliant datasets. In an example, a first model uses data provided by one entity, while the second model uses data from another entity. These datasets remain isolated to ensure privacy compliance and avoid data mixing. Both models are trained to analyze digital content opportunities and predict the likelihood of user engagement with digital content. This dual-model approach allows the system to leverage insights from different datasets, enhancing decision-making while adhering to strict privacy rules.

When a digital content opportunity occurs, the system receives a digital content request (e.g., a bid) containing real-time data. This data can include anonymized user information, digital content details, contextual data about the media where the digital content will appear, and device-specific information such as the operating system. This information can be processed in real-time to provide a comprehensive view of the opportunity.

The received data can be processed through both ML models independently. The first model generates a propensity score that predicts the probability of user engagement based on the data from the first entity. Similarly, the second model generates a propensity score using data from the second entity. These scores range between zero and one, where higher scores indicate a greater likelihood of user interaction with the digital content.

The system evaluates these scores to select digital content from a pool of available options. The selection is guided by a combination of the propensity scores and the details provided in the digital content request, such as the placement type, size, and contextual relevance. This ensures that the chosen digital content aligns with the user's interests, the client's objectives, and the digital content slot's specifications.

To enhance flexibility, the system supports untrained ML models that can be customized with adjustable input features. These features include user demographics, historical click-through rates, digital content format preferences, and device types. This adaptability allows the system to cater to specific campaign needs or optimize for unique digital content inventories.

The programmatic digital content service hosting the system integrates several key components. A real-time bidding engine of a bidder module processes auction-based opportunities, while a data management layer of the bidder module handles the ingestion and organization of datasets from multiple sources. This infrastructure can ensure that the system can manage high volumes of data and digital content opportunities efficiently.

By separating datasets provided by different entities, the system ensures compliance with privacy regulations and maintains data integrity. This logical isolation allows each entity to retain control over its data while benefiting from the shared infrastructure. This setup is particularly useful for scenarios where an external entity collaborates with a service operator for digital content delivery and bidding services.

The real-time processing capabilities of the system enable clients to respond dynamically to digital content opportunities. For example, contextual information about the user's media consumption or device can guide more precise digital content placement. Additionally, the system supports the selection of digital content inventory based on real-time data, ensuring that the most relevant digital content is displayed.

Overall, the system's design is tailored for programmatic digital content environments that require high-speed, data-driven decision-making. Its ability to process anonymized datasets from multiple sources, generate propensity scores through ML models, and select digital content based on these scores ensures efficient and targeted digital content delivery. Furthermore, the integration of privacy compliance measures, flexible model customization, and robust data management makes the system scalable and adaptable to a wide range of digital content scenarios.

This system aligns with the goals of programmatic digital content by automating and optimizing digital content placement while maintaining a strong commitment to privacy and security. Its multi-model framework, real-time processing capabilities, and support for complex data workflows position it as a powerful solution for modern digital content challenges.

The described techniques and systems, including those covered by the claims herein, provide substantial efficiencies in how compute resources are utilized, particularly in handling complex ML tasks for digital content selection. By hosting multiple ML models tailored to distinct datasets, the system enables distributed processing of digital content requests. This approach reduces computational bottlenecks, as each model can operate in parallel on logically segregated datasets, ensuring improved resource utilization.

Furthermore, the separation of ML models trained on distinct datasets allows for workload distribution across processors. This reduces the risk of overloading a single computational node, which is particularly critical in high-traffic programmatic digital content environments. The ability to process real-time data and generate propensity scores for multiple digital content simultaneously ensures that compute resources are allocated dynamically based on demand, preventing unnecessary resource consumption.

The system's ability to customize ML models with adjustable input features also minimizes computational overhead during training and inference. By tailoring models to specific campaigns or digital content inventories, the system avoids processing irrelevant data, thereby reducing the computational complexity of predictions. This adaptability not only enhances performance but also conserves processing power, which is important for large-scale, real-time bidding systems.

In addition, the described systems and techniques significantly improve the storage of datasets by enforcing logical segregation and ensuring compliance with privacy regulations. The separation of datasets into isolated storage compartments minimizes the risk of data leakage and unauthorized access, while also simplifying data management. This logical segregation allows for precise control over data access and processing, reducing the need for complex storage architectures.

Additionally, by storing only anonymized user and digital content data, the system reduces the storage footprint. Anonymization processes ensure that unnecessary personally identifiable information (PII) is excluded, thereby reducing the volume of stored data. This not only conserves storage resources but also aligns with privacy regulations, eliminating the need for costly compliance-driven storage expansions.

The system's support for real-time data processing further enhances storage efficiency. Real-time data, such as digital content requests and contextual information, can be processed and acted upon immediately, reducing the need for persistent storage of transient data. This design minimizes the accumulation of unnecessary data and ensures that storage resources are used primarily for datasets that are needed for model training and optimization.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a computer-implemented environment 100 including one or more ML models to facilitate selection of a digital content bid for a digital content opportunity. The computer-implemented environment 100 can include one or more compute resources and one or more computer-implemented storage resources. The one or more compute resources can provide scalable, on-demand computing power for applications and other resources. For example, the one or more compute resources can include one or more virtual machines, one or more containers, serverless compute resources, bare-metal servers, GPUs and/or other accelerators, managed compute services, edge computing resources, and the like. The one or more computer-implemented storage resources can include block storage, object storage, file storage, archival storage, data backup services, hybrid storage solutions, high-performance storage solutions, edge storage, database-specific storage, and the like.

The computer-implemented environment 100 can include a computing device 104 that is connected to a network 106. The computing device 104 that can connect to the network 106 can encompass a wide range of hardware designed for various purposes and capabilities. Computing devices can include desktop computers and laptops, which serve as versatile tools for both personal and professional tasks, often relying on wired or wireless connections for internet access. Smartphones and tablets are ubiquitous mobile devices that connect to networks through Wi-Fi or cellular services, enabling on-the-go communication, browsing, and application usage. Additionally, servers and mainframes are integral to enterprise environments, facilitating data processing, storage, and network management across large-scale systems.

The network 106 can range from private to public and hybrid configurations, depending on the desired level of accessibility, security, and performance. Public networks, such as the internet, are commonly used for broad access to cloud services, leveraging secure protocols like HTTPS and virtual private networks (VPNs) to ensure data integrity and confidentiality. Private networks, including dedicated leased lines or MPLS (Multiprotocol Label Switching) connections, offer enhanced security and reliability by directly linking an organization's infrastructure to the cloud service provider. The network 106 can include hybrid networks that combine public and private elements, enabling organizations to flexibly manage sensitive data within a private environment while utilizing the scalability of public cloud resources. In addition, VPNs and software-defined wide-area networks (SD-WANs) are often employed to create secure, efficient connections between on-premises systems and cloud-based services, ensuring optimized traffic routing and improved performance. The network 106 can include wireless networks, such as Wi-Fi and 5G, which can play an important role in providing mobile and remote access to cloud services. These varied network types, which can be deployed by the network 106, collectively enable seamless connectivity to cloud environments, catering to diverse use cases and organizational requirements.

In at least one embodiment, a user of the computing device 104 accesses a cloud-based digital content service 108 via the network 106. A cloud-based digital content service 108 can provide a suite of services designed to optimize the creation, management, delivery, and analysis of digital content campaigns across multiple channels. The cloud-based digital content service 108 can offer tools for campaign creation and management, enabling clients to design digital content, select target audiences, and allocate budgets efficiently. In some examples, the cloud-based digital content service 108 is an automated system that utilizes algorithms and real-time data analysis to facilitate the efficient exchange of digital content or assets. It integrates multiple decision-making nodes through a centralized matching engine that enables high-frequency, real-time asset allocation. This mechanism operates on a sub-second timescale, broadcasting enriched data packets to distributed processing units. These units employ rapid computational analysis to evaluate the data against predefined parameters and respond with a valuation metric within milliseconds. The central system then uses a priority algorithm to determine the optimal allocation based on these metrics and facilitates the immediate delivery of the selected digital content. This process allows for precise targeting and dynamic content delivery across various digital channels within a delivery threshold (e.g., completing within 100-200 milliseconds). The system leverages distributed computing, high-speed networking, and efficient data processing algorithms to handle millions of transactions per second across a global server network. This automation enhances operational efficiency, optimizes resource allocation, and enables rapid adjustments based on performance metrics.

Audience targeting services of the service 108 can leverage ML and vast datasets to deliver personalized digital content based on demographics, behavior, and interests. Real-time bidding services, such as the request (e.g., bidder) module 110 of the service 108, can allow clients to participate in automated auctions for digital content placements, ensuring optimal reach at competitive costs. Analytics and performance monitoring tools of the service 108 can provide actionable insights through dashboards and reports, detailing metrics like impressions, click-through rates, and conversions. Additionally, the service 108 can include integrations with social media, search engines, and other digital channels, offering unified control over multi-channel campaigns. Advanced services may also incorporate AI-driven digital content optimization, which continuously adjusts campaigns to improve performance and return on investment.

In at least one embodiment, the cloud-based digital content service 108 can include one or more services, such as a sponsored digital content service and a programmatic digital content service. In at least one embodiment, the programmatic digital content service enables clients to promote their products directly on various cloud-based marketplaces. It includes formats such as sponsored products, sponsored brands, and sponsored display digital content. This digital content can appear within search results and product detail pages, targeting shoppers actively browsing the site. The sponsored digital content service can allow clients to programmatically purchase display, video, and audio digital content on cloud-based marketplaces and other services. This service leverages cloud-based marketplaces' extensive audience data to target digital content across various marketplace owned sites, as well as third-party websites and applications. The sponsored digital content service is designed to reach audiences beyond those actively shopping on a marketplace, facilitating broader brand awareness and engagement.

The request module 110 of the cloud-based digital content service 108 is a system or service designed to evaluate digital content opportunities, generate bid amounts, and participate in real-time auctions to secure digital content placements. The request module 110 operates as a highly scalable and low-latency component capable of handling millions of digital content opportunities per second. The request module 110 can incorporate multiple modules that work in coordination to process incoming bid requests, evaluate their relevance to active digital content campaigns, and submit bids, ensuring efficient utilization of computational resources and alignment with campaign objectives.

The request module 110 can receive bid requests from supply-side services or digital content exchanges, such as a digital content exchange module 112. These bid requests include information such as anonymized user data, device specifications, digital content slot details (such as size and placement), and auction parameters like the minimum bid price and auction type. An input processor of the request module 110 validates and preprocesses the bid requests, ensuring the data is complete and formatted for subsequent processing. The validated data is then passed to the evaluation core of the bidding engine.

The request module 110 can leverage one or more ML models hosted by infrastructure of the environment 100 to analyze the bid requests. These ML models can generate propensity scores that estimate the likelihood of user engagement with digital content, such as clicks or conversions. In addition, the request module 110 can evaluate the potential return on investment for each opportunity based on historical campaign performance and contextual factors. In at least one embodiment, the request module 110 combines these predictions with predefined campaign rules, such as budget constraints, frequency limits, and pacing requirements, to compute an optimal bid amount for each digital content opportunity. Multi-objective optimization algorithms ensure that bids are competitive while adhering to the client's financial and strategic goals.

Once a bid is generated, an output handler of the request module 110 formats and submits the bid to the digital content exchange module 112 or supply-side service. The bid can include the calculated bid amount, identifiers linking to the digital content assets, and relevant metadata such as tracking links for monitoring post-auction performance. The request module 110 can also support real-time feedback loops, where data from completed auctions, such as impressions, clicks, and conversions, is ingested back into the cloud-based digital content service 108 and/or the request module 110. This feedback can be used to refine the ML models, improve the accuracy of propensity scores, and dynamically adjust campaign-level rules to enhance future bidding decisions.

In at least one embodiment, the cloud-based digital content service can include a request storage 114. The storage 114 can host requests/bids temporarily at various stages of processing to ensure efficient and real-time operations. During the initial stages, bid requests and intermediate data are often stored in in-memory storage systems of the request storage 114 to enable low-latency access and rapid processing. The request storage 114 can hold data like bid metadata, user context, and auction parameters while the request module 110 evaluates a digital content opportunity. As bids move through the service 108, they may also be placed in temporary queues or streaming services of the request storage 114, which decouple the different stages of bid evaluation, scoring, and submission. This allows the service 108 to handle high volumes of bid requests asynchronously without bottlenecks.

Once a bid is processed and ready for submission, the relevant data can be cached briefly in the request storage 114 to maintain responsiveness in real-time bidding environments. This cached data can include calculated propensity scores, campaign-specific constraints, and creative identifiers. After submission, the cloud-based digital content service

108 can log bid-related metadata and auction outcomes in more persistent storage systems of the request storage 114, such as relational or NoSQL databases. These databases can store information about whether bids were successful, their amounts, and any associated outcomes like clicks or conversions. For long-term analytics and ML model training, historical bid data and outcomes can be archived in data lakes associated with the request storage 114. These storage solutions enable large-scale analysis and compliance with regulatory data retention requirements.

By employing a combination of in-memory caches, temporary queues, databases, and data lakes, the cloud-based digital content service 108, aided by the request storage 114, can efficiently manage bids across their lifecycle. This layered storage architecture can provide low latency for real-time operations, scalability to handle high traffic, and robust storage for post-auction analysis and optimization. The ability to dynamically use different storage solutions based on the stage of bid processing can be important for meeting the demands of modern programmatic digital content delivery services.

In at least one embodiment, the request module 110 includes at least a client (e.g., advertiser) ML model 116 and the service ML model 118. In an example, the client ML model 116 can be a proprietary ML model of an advertiser that submits bids to the cloud-based digital content service 108. In other implementations, the client ML model 116 is a modified version of the service ML model 118. For example, in at least one embodiment, the client ML model 116 is a bring your own model (BYOM) trained using proprietary digital content related data of the advertiser and then the trained model is deployed in the request module 110 to generate propensity scores. In at least one embodiment, a BYOM is a framework or approach where a client develops and trains their ML models externally (using their preferred tools or services) and then deploys or integrates these models into the cloud-based digital content service 108 for inference, scalability, or management. In at least one embodiment, the client ML model 116 is based on an untrained version of the service ML model 118, where the untrained version of the service ML model 118 is trained using proprietary data of an advertiser to provide the client ML model 116. In other examples, the client ML model 116 is generated by training an untrained version of the service ML model 118 using the proprietary data of the client. In some examples, the client ML model 116 is generated by training an untrained version of the service ML model 118 using the proprietary data of the client and additional data provided by the cloud-based digital content service 108.

In some examples, one or more of the client ML model 116 or the service ML model 118 are built using an ML algorithm, such as logistic regression, random force, and/or gradient boosting machines. One or more of the models 116 or 118 can be trained using a combination of datatypes, including proprietary data from multiple entities (e.g., advertiser and/or cloud-based service provider). The training data can include a diverse range of data that provides insights into user behavior, preferences, and engagement patterns. An example data type is user behavior data, which includes clickstream data (tracking user interactions such as clicks and views), search queries, purchase history, and browsing activities. These inputs help capture a user's intent and interests. Additionally, digital content performance data can be used to train the models. This data can include click-through rates (CTR), conversion rates, impressions, and engagement metrics (e.g., likes, shares, and comments), which can allow the client ML model 116 or the service ML model 118 to understand how users interact with digital content.

The training data can also include demographic and profile data, including age, gender, location, and inferred attributes like income or occupation. The training data can include contextual and environmental data, such as the type of device (mobile or desktop), time of day, and geolocation, which can help refine the understanding of user engagement trends. In some examples, the training data includes historical campaign data, encompassing features of past digital content campaigns (e.g., format, creative elements) and targeting criteria. In some implementations, the training data can further include product and catalog data, including metadata like product descriptions, categories, ratings, reviews, and price trends. This data can help the client ML model 116 or the service ML model 118 analyze how discounts, promotions, or product similarity influence user behavior. Additionally, the training data can include data from other sources such as third-party audience insights, seasonality trends (e.g., holiday shopping patterns), and macroeconomic indicators (e.g., inflation or consumer confidence), which can allow the client ML model 116 or the service ML model 118 to provide a broader contextual understanding.

In some embodiments, the described data are processed with strict adherence to privacy regulations, such as GDPR and CCPA, ensuring that personally identifiable information (PII) is anonymized or aggregated. This multi-faceted data, coupled with advanced feature engineering, enables the client ML model 116 or the service ML model 118 to predict user likelihood to engage with digital content or make purchases effectively.

In some implementations, the client ML model 116 can be based on a tunable ML model designed for generating propensity scores that the client can customize to meet their specific needs. Therefore, the tunable ML model can include a pre-trained ML model trained on a broad digital content related dataset representing generalizable patterns. A client can upload their datasets to the cloud-based digital content service 108 to personalize the tunable ML model, ensuring that it aligns with their domain-specific requirements. For example, an advertiser can train the tunable ML model using customer transaction history to predict purchase likelihood.

Additionally, the tunable ML model can allow adjustments to key hyperparameters, such as learning rate, tree depth, and the number of iterations in gradient boosting models, or layer configurations in neural networks. This flexibility can improve model performance for each specific use case, balancing speed, accuracy, and computational efficiency. The tunable ML model can support domain-specific feature engineering. For instance, the tunable ML model might enable companies to add custom variables, such as seasonal trends for retail.

In at least one embodiment, the client ML model 116 is an in-house model tailored to their specific advertising objectives, such as optimizing engagement for a niche audience, driving foot traffic to physical stores, or improving brand awareness. The client ML model 116 can incorporate business-specific metrics and key performance indicators (KPIs) that may not align perfectly with training performed to generate the service ML model 118. For example, the client ML model 116 can be trained to predict nuanced behaviors like cross-channel engagement (e.g., social media to website conversions). For example, the client ML model 116 can be trained with proprietary data from the client's digital content campaigns, such as digital content impressions, clicks, conversions, creative performance metrics, and customer journey data. These insights are directly relevant to digital content performance and audience behavior, making the client ML model 116 highly specific to the client's needs.

At least one embodiment, the service ML model 118, usable for propensity scoring, offers a convenient, powerful solution for many use cases and advertisers. However, for some advertisers, an advertiser ML model, such as the client ML model 116, trained with the client's own digital content-related data provides customization, specificity, and control. By leveraging proprietary data, focusing on niche audiences for example, and tailoring the client ML model 116 to campaign-specific goals, clients can achieve more precise and actionable predictions. Additionally, owning the client ML model 116 can ensure data privacy and the flexibility to adapt in real-time, making it a better choice for some clients with unique needs or complex strategies.

In at least one embodiment, data, such as in one or more datasets, for training the service ML model 118 and/or the client ML model 116 can be hosted by the cloud-based digital content service 118. In at least one embodiment, the data can be hosted in a clean room environment that provides secure hosting of the data and/or anonymization of data.

In some examples, the data for training the client ML model 116 can include diverse client specific data sources to estimate the likelihood of user engagement, such as clicking on digital content or completing a purchase. For example, the client ML model 116 can be trained using user behavioral data, including clickstream activity, browsing history, and social media interactions, to capture patterns of engagement. Demographic and profile data, such as age, gender, income, and psychographics, can also be used in training to understand audience preferences. Campaign-specific data can be included in the training data, including digital content attributes (e.g., creative type, format) and placement details, which can further refine the model's ability to predict digital content performance. Contextual data, such as time of day, geolocation, and environmental factors like weather or local events can be included in the training data to help ensure that predictions are sensitive to external conditions influencing user behavior.

Conversion data, including purchase history, post-click actions, and attribution insights, links user engagement to actual outcomes, can be used to help the client ML model 116 learn from the full user journey. Auction data, such as historical bids and aggregated competitor insights, can be used to help the client ML model 116 learn about bidding dynamics. To ensure compliance with privacy regulations, the client ML model 116 can be trained using anonymized, aggregated, or federated data to protect user privacy. Additionally, engineered features, such as rolling averages of engagement or behavioral clusters, can be used to train the client ML model 116 in order to improve the model's accuracy by emphasizing relevant patterns. By combining these diverse data points, the client ML model 116 can provide propensity scores, which are used in real-time to inform bidding strategies, helping the client improve their spend and maximize ROI.

In some examples, the data for training the service ML model 118 can include diverse service marketplace specific data sources to estimate the likelihood of user engagement, such as clicking on digital content or completing a purchase. For example, the service ML model 118 can be trained using user behavioral data determined from various digital content campaigns, including clickstream activity, browsing history, and social media interactions, to capture patterns of engagement. Demographic and profile data from a variety of digital content sources, such as age, gender, income, and psychographics, can also be used in training to understand audience preferences. Campaign-specific data can be included in the training data, including digital content attributes (e.g., creative type, format) and placement details, which can further refine the model's ability to predict digital content performance. Contextual data, such as time of day, geolocation, and environmental factors like weather or local events can be included in the training data to help ensure that predictions are sensitive to external conditions influencing user behavior.

Conversion data from a plurality of clients, including purchase history, post-click actions, and attribution insights, and links user engagement to actual outcomes, can be used to help the service ML model 118 learn from the full user journey. Auction data from a plurality of clients, such as historical bids and aggregated competitor insights, can be used to help the service ML model 118 learn about bidding dynamics. To ensure compliance with privacy regulations, the service ML model 118 can be trained using anonymized, aggregated, or federated data from a plurality of clients to protect user privacy. Additionally, engineered features, such as rolling averages of engagement or behavioral clusters, can be used to train the client ML model 116 in order to improve the model's accuracy by emphasizing relevant patterns. By combining these diverse data points from a plurality of clients, the service ML model 118 can provide propensity scores, which are used in real-time to inform bidding strategies, helping clients improve their digital content spend and maximize ROI.

Techniques for delivering digital content to the computing device 104 are illustrated in FIG. 1. In at least one embodiment, a user opens an application or visits a website using the computing device 104, and a digital content opportunity 120 arises when a digital content slot on the page or within the application becomes available. This event triggers a digital content request 122 from the application or website to the cloud-based digital content service 108. In some implementations, the digital content request 122 is processed by the digital content exchange module 112 and/or a supply-side service, which is responsible for auctioning the available digital content inventory.

The digital content exchange module 112 gathers relevant details about the opportunity, including the user's device type, location, application or site context, and, if permissible under privacy regulations, anonymized data about the user's preferences and behavior. This information is then packaged into a bid request generated by the digital content exchange module 112.

The bid request can be evaluated by the request module 110. In some implementations, the bid request may be temporarily stored in the request storage 114 while awaiting evaluation by the request module 110. In at least one embodiment, the request module 110 is part of a demand-side service, which acts on behalf of clients. In some implementations, multiple demand-side services may evaluate the bid request. The request module 110 evaluates the bid request using one or both of the client ML model 116 and the service ML model 118, which, as described, are trained on audience targeting, historical performance data, and campaign objective data.

For instance, if the user matches the client's target audience—for example, a young professional interested in fitness—the request module 110 calculates the maximum bid it is willing to place. This calculation often considers metrics such as the expected click-through rate (CTR), conversion rate, and the client's budget constraints.

Furthermore, in some implementations, one or both of the client ML model 116 and the service ML model 118 generate a propensity score. For example, the bid request can include anonymized user data and contextual information about the digital content opportunity 120. The request module 110, using one or both of the client ML model 116 and the service ML model 118, utilizes this data to calculate the propensity score. In one example, the propensity score estimates the probability of the user performing a specific action, such as clicking on the digital content, making a purchase, or signing up for a service. Therefore, the score is generated by one or both of the models 116 and 118, which are trained on historical user behavior and digital content performance data.

In at least one embodiment, two propensity scores are generated: a first propensity score from the client ML model 116 and a second propensity score from the service ML model 118. In some examples, other ML models within the request module 110 can also individually generate a propensity score. For instance, if the user of the computing device 104 has previously interacted with digital contents for similar products or shown an interest in fitness-related items, the request module 110 might assign a higher propensity score to this particular user-advertiser pairing. The higher the propensity score, the more valuable the impression is perceived to be, thereby influencing the bid amount.

In some implementations, when multiple propensity scores are generated by the request module 110—such as a first propensity score from the client ML model 116 and a second propensity score from the service ML model 118—the request module 110 selects the higher of the two propensity scores. In other implementations, the request module 110 calculates the average of the two propensity scores and uses this average value as the selected propensity score. In some examples, the request module 110 defaults to the second propensity score from the service ML model 118 if the first propensity score from the client ML model 116 does not exceed a predetermined threshold.

At least one embodiment, the request module 110 evaluates all incoming for the digital content opportunity 120 and selects the highest bidder, taking into account any additional constraints, such as floor pricing set by the publisher. In this process, the request module 110 and/or the cloud-based digital content service 108 selects the digital content creative (e.g., image, video, or text) that is most relevant for the specific user or context. For example, if the user of the computing device 104 is browsing a fitness application or website, the digital content creative might feature a promotional offer for workout equipment.

Once the auction is concluded by the request module 110, the cloud-based digital content service 108 notifies the winning bidder and delivers the digital content creative 124, via the digital content exchange module 112, to the user device 104 for integration into the application or website to use the digital content creative 124. In some embodiments, a publisher is used that integrates the digital content creative 124 into the webpage or application, ensuring it fits seamlessly within the layout. In some implementations, the cloud-based digital content service 108 instructs a publisher service 102 to deliver the digital content creative 124.

In some examples, the request module 110 uses the one or more of the generated propensity scores to determine a maximum bid it will place for the digital content opportunity 120. In some embodiments, one or more of the generated propensity scores are input into the bidding algorithm of the request module 110, which factors in the potential return on investment (ROI) for serving the digital content to the user of the computing device 104. For instance, if a user's one or more of the generated propensity scores indicate a high likelihood of conversion, the request module 110 may bid aggressively to win the impression, as the potential revenue from the conversion justifies a higher cost per mille (CPM) or cost per click (CPC). Conversely, a low propensity score might cause the request module 110 to generate a lower bid or no bid at all.

In some implementations, one or more of the generated propensity scores can also guide the selection of the most relevant digital content creative for the user. If the request module 110 identifies that the user has a high propensity to respond to discounts, the module 110 may select digital content featuring a promotional offer rather than a general branding message. This ensures that the digital content served is not only targeted but also optimized for maximum engagement.

In some embodiments, clients can use propensity scores generated by the client ML model 116 and/or the service ML model 118 to allocate budgets more effectively across campaigns. For example, by focusing on users with higher propensity scores, clients can maximize ROI and reduce wasted spend on low-propensity audiences. This targeting efficiency ensures that digital content budgets are spent on the most promising opportunities.

FIG. 2 illustrates an example formatting for the digital content request 122. In at least one embodiment, the digital content request 120 is formatted using JavaScript object notation (JSON). However, other formatting can be used for the digital content request 120, such as extensible markup language (XML), YAML ain't markup language (YAML), Tom's obvious, minimal language (TOML), and the like. The provided JSON represents an example of a digital content request generated by the computing device 104 when the digital content opportunity 120 occurs. This digital content request 122, structured for real-time bidding, communicates critical details about the digital content slot, the user, and the context in which the digital content will be displayed.

An id field 200 serves as a unique identifier for the digital content request 122, ensuring traceability throughout the bidding process. The placement array 202 contains details about the impressions or digital content opportunities available. Each placement object, such as the one identified by id 204, specifies the digital content format through a banner object 206. The banner details include width, height, and position on the page. Additional metadata, like placement identifier and allowed digital content types such as banners or videos can be included in the section and can provide clients with more information about the impression.

A site object 220 contains details about the website or application where the digital content will appear. It includes a site ID 222, a name 224, and a domain 226. Contextual information is provided through a page URL 228, a referrer URL 230, and keywords 232 associated with the page, enabling better targeting based on the content.

A device object 234 provides information about the computing device 104, including a user agent string 236, IP address 238, and geolocation data 240. Geolocation fields include latitude 242, longitude 244, country 246, region 248, and city 250, allowing clients to deliver location-based digital contents. Additional device specifications, such as operating system 252, OS version 254, device type 256, and model 258, help ensure digital content compatibility.

A user object 260 can describe details about an individual interacting with the computing device 104. For example, while not illustrated, the information associated with the user object 260 can include a user ID that uniquely identifies the user, a buyer-specific ID that links the user to the client's system.

Additional information can be included in the digital content request 122. This information can include regulatory compliance information. For example, COPPA information can be included to indicate whether children's privacy protections apply, while the GDPR can be included to ensure compliance with European data protection laws or other regional data protection laws.

FIG. 3 illustrates example propensity scores output by the request module 110 of the cloud-based digital content service 108. In at least one embodiment, the request module 110 outputs propensity scores 300 corresponding to processing performed by the client ML model 116. In addition, in at least one embodiment, the request module 110 outputs propensity scores 302 corresponding to processing performed by the service ML model 118.

Context information associated with the digital content opportunity can also be included with the provided propensity scores 300. For example, the context information can include the user's ID, device type, location, time of day, and the category of the application to display the chosen digital content creative. Similarly, the propensity scores 302 also include the context information. As shown, the propensity scores 300 are slightly greater than the propensity scores 302. In at least one embodiment, the difference between the propensity scores 300 and 302 may be based on the different training sets used to train the client ML model 116 and the service ML model 118. In addition, the request module 110, aided by one or more of the models 116 and 118, can include the recommended bid value in each of the propensity scores 300 and 302.

In at least one embodiment, the request module 110 and/or the cloud-based digital content service 108 can select at least one of the propensity scores 300 or 302 as an input to a bidding algorithm of the request module 110. This bidding algorithm of the request module 110 can generate a bid for placing digital content based on a digital content opportunity, such as the digital content opportunity 120. In at least one embodiment, the request module 110 can select both propensity scores 300 and 302 as inputs to the bidding algorithm of the request module 110. In another example, the request module 110 selects the higher of the two propensity scores, 300 or 302, as the input to the bidding algorithm of the request module 110. In at least one implementation, the request module 110 calculates an average of the two propensity scores, 300 and 302, and uses the average as an input to the bidding algorithm of the request module 110. In another example, the request module 110 compares the propensity score 300 against a predetermined threshold and selects the propensity score 304 as the input to the bidding algorithm of the request module 110 when the propensity score 300 satisfies the threshold. Alternatively, the request module 110 selects the propensity score 302 when the propensity score 300 is below the threshold.

In some embodiments, the bidding algorithm of the request module 110 can receive additional inputs, besides one or more propensity scores, to determine a bid for placing digital content based on a digital content opportunity. These inputs can be categorized into user data, contextual information, opportunity metadata, client parameters, and performance-related metrics. These inputs can enable the algorithm to make precise, data-driven decisions in real-time bidding environments. For example, a user data input can include anonymized user identifiers, demographics such as age, gender, and location, and behavioral data like browsing history, search queries, and past purchases. Additionally, the algorithm may utilize predefined audience segments such as "frequent shoppers" or "tech enthusiasts" to better align the digital content with user preferences.

The contextual information input can include the application, website, or service generating the digital content request 122, content-related keywords, and the page or application section where the digital content will appear. Geolocation data, such as latitude, longitude, and city, can provide additional targeting opportunities for location-based digital contents. Temporal factors, like the time of day or week, can also influence user behavior and bidding decisions.

The input data can also include metadata that describes the technical specifications and attributes of the digital content placement. This can include the unique identifier for the impression, the format of the digital content (e.g., banner, video, or native), its dimensions, and its position on the page or screen.

The input data can also include client parameters to guide the algorithm in aligning bids with campaign objectives. These parameters can include targeting criteria, campaign-specific goals like brand awareness or conversions, and budget constraints, such as maximum spend per impression or daily limits. The input data can identify creative assets available for selection, including personalized or generic digital content variations.

In addition, the input data can include historical performance data, such as CTR, conversion rates (CVR), and past campaign results. In some implementations, the input data can include regulatory, and privacy data ensure compliance with laws like GDPR and CCPA. The data can include consent strings indicating user preferences for personalized advertising, while privacy flags may restrict access to specific data fields. When personalized inputs are unavailable, the algorithm may rely on contextual signals to make bidding decisions.

FIG. 4 illustrates a flow diagram 400 including various processing acts, implemented by a system environment with one or more computing devices, which provide bid generation based on a plurality of ML models to generate propensity scores. In some implementations, the acts of the flow diagram 400 are executed by one or more computing devices of the example environment 100 illustrated in FIG. 1 and/or FIG. 2. The example environment 100 may execute computer-executable instructions incorporating at least some of the processing acts of the flow diagram 400 to provide bid generation based on a plurality of ML models to generate propensity scores.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At block 402, a computer-implemented storage system is provided to host first data from an external entity and second data of an entity that provides the data clean room. The data clean room is configured to anonymize the first and second data to generate first anonymized data and second anonymized data. The data clean room can be further configured to at least restrict reading the first data and the second data based on one or more predefined permissions associated with the data clean room. In at least one embodiment, the data clean room is a secure computing environment designed for privacy-preserving data collaboration and analysis. It employs a multi-layered security approach, incorporating secure enclaves, robust encryption (both at rest and in transit), and stringent access controls. Advanced privacy-preserving techniques such as data anonymization, tokenization, differential privacy, and in some cases, homomorphic encryption or secure multi-party computation (a cryptographic technique allowing multiple parties to jointly compute a function over their inputs while keeping those inputs private), are implemented to protect sensitive information while enabling meaningful analysis. The clean room typically features a sandboxed analytics environment with approved tools, comprehensive audit logging, secure data transfer protocols, and output controls to prevent data leakage. Additional security measures often include network segmentation (including air-gapping or highly restricted network access), containerization for process isolation, and potential integration with secure hardware modules. This highly controlled environment allows multiple parties to combine and analyze sensitive data without compromising individual privacy or data ownership, making it an invaluable tool for secure data collaboration for various applications.

In at least one implementation, the data clean room is included in the environment 100. The data clean room can be provided by the cloud-based digital content service 108. In some examples, the external entity is a corporation that engages the entity for various cloud-based services. The entity can be a cloud-based service provider that provides an online marketplace, distributed compute resources, distributed computer-implemented storage systems, and so forth.

At block 404, a service is provided to host at least a first trained ML model and a second trained ML model. The first ML model is trained using user data, digital content data, and contextual data determined by the external entity and partially included in the first data. The second ML model is trained using user data, digital content data, and contextual data determined by the entity providing the service and partially included in the second data. In at least one embodiment, the service corresponds to the cloud-based digital content service 108. In at least one implementation, the service hosts any number of trained ML models. In an example, the service corresponds to the request module 110. The first ML model can be the client ML model 116. The second ML model can be the service ML model 118. Training of the first and second ML models can be performed by the cloud-based digital content service 108. The training of the ML models can occur in a data clean room environment. In at least one embodiment, the data clean room environment can be implemented by part of the environment 100 and/or the cloud-based service 108. This data clean room environment can be a collaborative computing environment designed to allow multiple parties to share and process sensitive or proprietary data without exposing the raw data itself. The clean room environment can be configured to enhance data privacy through techniques like anonymization, encryption, and differential privacy, making it compliant with regulations such as GDPR, CCPA, and HIPAA. Data contributed by each party can be logically separated and processed in a secure, centralized or federated system, preventing unauthorized access or mixing. The clean room environment can implement advanced tools like federated learning, secure multiparty computation (SMPC), or homomorphic encryption enable the training of ML models on combined datasets without revealing the underlying raw data.

In some embodiments, the data clean room can provide collaborative data analysis, such as between a service providing entity (e.g., publisher) and an external entity (e.g., advertiser), without exposing sensitive or personally identifiable information (PII). A feature of the data clean room can be an ability to anonymize or pseudonymize data, ensuring that individual-level information is not directly accessible. The data clean room can include built-in access controls and permissions, allowing only authorized users to perform specific operations, such as aggregating data, generating insights, and/or reading data (e.g., non-anonymized data) hosted by the data clean room.

At block 406, a digital content request is obtained, triggered by a digital content opportunity on a computing device. The digital content request includes an information dataset containing details about the computing device, anonymized user information, and contextual information. In some examples, the digital content request corresponds to the digital content request 122. The digital content opportunity can correspond to the digital content opportunity 120 generated by the computing device 104. The information dataset can be included in the digital content opportunity 120.

At block 408, the information dataset is processed using the first trained ML model to generate a first propensity score representing the probability of a user engaging with digital content. The first propensity score can be included in the one or more propensity scores 300 generated by the request module 110.

At block 410, the information dataset is processed using the second trained ML model to generate a second propensity score representing the probability of the user engaging with the digital content. The second propensity score can be included in the one or more propensity scores 302 generated by the request module 110.

At block 412, based at least in part on one or both of the first and second propensity scores, digital content is selected from a plurality of digital contents to display on the computing device. The selected digital content can correspond to the digital content included in the digital content delivery 124. The plurality of digital contents can be hosted by the digital content exchange module 112 and/or the cloud-based digital content service 108. Alternatively, the plurality of digital contents can be hosted by distributed storage of the publisher service 102.

FIG. 5 illustrates another flow diagram 500 including various processing acts, implemented by a system environment with one or more computing devices, which provide bid generation based on a plurality of ML models to generate propensity scores. In some implementations, the acts of the flow diagram 500 are executed by one or more computing devices of the example environment 100 illustrated in FIG. 1 and/or FIG. 2. The example environment 100 may execute computer executable instructions incorporating at least some of the processing acts of the flow diagram 500 to provide bid generation based on a plurality of ML models to generate propensity scores.

At block 502, a first ML model and a second ML model are hosted. The first ML model is trained using a first privacy-compliant dataset, and the second ML model is trained using a second privacy-compliant dataset. In at least one embodiment, the ML models are hosted by the cloud-based digital content service 108. In at least one embodiment, the first privacy-compliant dataset is associated with a first entity that is distinct from a second entity associated with the second-privacy-compliant dataset or the first ML model comprises embedded proprietary parameters caused to be obfuscated by the first entity to prevent the second entity from accessing the proprietary parameters. In some embodiments, the embedded proprietary parameters are caused to be obfuscated using encryption. In some embodiments, the embedded proprietary parameters comprise one or more proprietary model weights and/or biases. These model weights and/or biases can encode knowledge derived from training the first ML model using the first privacy-compliant data set. In some examples, the embedded proprietary parameters comprise one or more hyperparameters. These hyperparameters can be associated with a learning rate of the first ML model and/or a design of the first ML model, such as a number of neurons or layers implemented by the first ML model. In some implementations, the embedded proprietary parameters can comprise one or more parameters of the first ML model that encode private or proprietary data of the first entity revealed to other entities that are not associated with the first entity. The embedded proprietary parameters can comprise other parameters and/or data in addition to some or all of those described herein.

In at least one implementation, the service hosts any number of trained ML models. In an example, the service corresponds to the request module 110. The first ML model can be the client ML model 116. The second ML model can be the service ML model 118. Training of the first and second ML models can be performed by the cloud-based digital content service 108. The training of the ML models can occur in a clean room environment. This clean room environment can be a collaborative computing environment designed to allow multiple parties to share and process sensitive or proprietary data without exposing the raw data itself. The clean room environment can be configured to enhance data privacy through techniques like anonymization, encryption, and differential privacy, making it compliant with regulations such as GDPR, CCPA, and HIPAA. Data contributed by each party can be logically segregated and processed in a secure, centralized or federated system, preventing unauthorized access or mixing. The clean room environment can implement advanced tools like federated learning, SMPC, or homomorphic encryption enable the training of ML models on combined datasets without revealing the underlying raw data.

At block 504, a digital content request is obtained, including a dataset comprising user data and digital content data. In some examples, the digital content request corresponds to the digital content request 122 based on a digital content opportunity. The digital content opportunity can correspond to the digital content opportunity 120 generated by the computing device 104. The dataset can be included in the digital content opportunity 120.

At block 506, the dataset is processed using the first ML model to generate a first score representing the probability of a user engaging with digital content. The first score can be included in the one or more propensity scores 300 generated by the request module 110.

At block 508, the dataset is processed using the second ML model to generate a second score representing the probability of the user engaging with the digital content. The second score can be included in the one or more propensity scores 302 generated by the request module 110.

At block 510, at least one digital content is selected from a plurality of digital contents based on one or both of the first and second scores. The selected digital content can correspond to the digital content included in the digital content delivery 124. The plurality of digital contents can be hosted by the digital content exchange module 112 and/or the cloud-based digital content service 108. Alternatively, the plurality of digital contents can be hosted by distributed storage of the publisher service 102.

Figure 6:
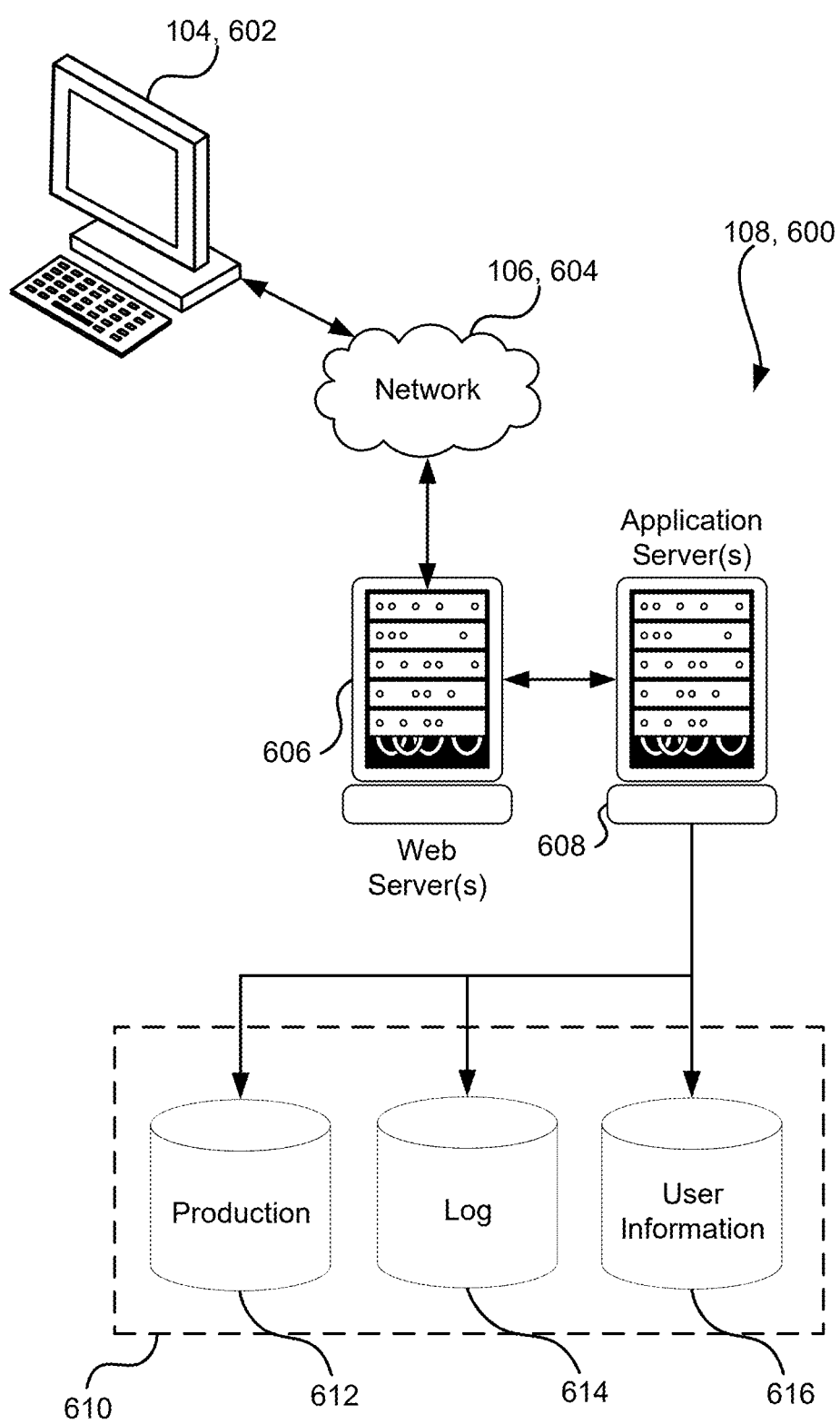
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application. As used herein, a module can refer to a component or subsystem that performs a specific function or set of functions within a described system or environment. Therefore, a module can include one or more compute resources and/or one or more computer-implemented storage resources used to perform the described functions associated with the module.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol.

Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

At least one embodiment of the disclosure can be described in view of the following clauses:

Clause 1. A computer-implemented method, comprising: providing a data clean room to host first data from an external entity and second data of an entity that provides the data clean room, the data clean room configured to anonymize the first and second data to generate first anonymized data and second anonymized data, the data clean room further configured to at least restrict reading the first data and the second data based on one or more predefined permissions associated with the data clean room; providing a service to host at least a first trained machine learning (ML) model and a second trained ML model, the first ML model trained using user data, digital content data, and contextual data determined by the external entity and at least partially comprised in the first anonymized data and the second trained ML model trained using user data, digital content data, and contextual data determined by the entity and at least partially comprised in the second anonymized data; obtaining a digital content request triggered based on a digital content opportunity on a computing device, the digital content request comprising an information dataset including information associated with the computing device, anonymized user information, and contextual information; processing the information dataset using the first trained ML model to generate a first propensity score representing a first probability of a user engaging digital content; processing the information dataset using the second trained ML model to generate a second propensity score representing a second probability of a user engaging digital content; and based, at least in part, on one or more of the first and second propensity scores, selecting at least one digital content from a plurality of digital content to display on the computing device.

Clause 2. The computer-implemented method according to clause 1, wherein selecting the at least one digital content is based on the first and second propensity scores.

Clause 3. The computer-implemented method according to any one or more of the preceding clauses, wherein the external entity is a first company and the entity is a second company, the second company providing a demand side service to make a bid, on behalf of the first company, to display the at least one digital content on the computing device.

Clause 4. The computer-implemented method according to any one or more of the preceding clauses, wherein the second trained ML model is based on an untrained ML model provided by the entity, the untrained ML model comprising adjustable input features comprising one or more of user demographics, digital content format, user browsing history, device type, or historical click through rate (CTR).

Clause 5. A system, comprising: one or more processors; memory that stores computer-executable instructions that are executable by the one or more processors to cause the system to: host a first machine learning (ML) model and a second ML model, the first ML model trained using a first privacy-compliant dataset and the second ML model trained using a second privacy-compliant dataset, the first privacy-compliant dataset associated with a first entity that is distinct from a second entity associated with the second-privacy-compliant dataset or the first ML model comprises embedded proprietary parameters caused to be obfuscated by the first entity to prevent the second entity from accessing the proprietary parameters; obtain a digital content request including a dataset comprising user data and digital content data; process the dataset using the first ML model to generate a first score representing a first probability of a user engaging digital content; process the dataset using the second ML model to generate a second score representing a second probability of a user engaging digital content; and select at least one digital content from a plurality of digital content based on one or more of the first and second scores.

Clause 6. The system according to any one or more of the preceding clauses, wherein the first ML model is provided by the first entity and the second ML model is provided by the second entity, the second entity providing a service to host the first ML model provided by the first entity, the service provided by the second entity further provided to receive the dataset and cause the first and second ML models to process the dataset.

Clause 7. The system according to any one or more of the preceding clauses, wherein the user data and the digital content data comprise real-time data triggered when a digital content opportunity occurs on a computing device of the user, the user data comprising anonymized information about the user and the digital content data comprising digital content inventory information including placement type and size for the at least one digital content, the real-time data further comprising contextual information associated with media that will present the at least one digital content and device information comprising at least an operating system of the computing device.

Clause 8. The system according to any one or more of the preceding clauses, wherein the memory that stores the computer-executable instructions that are executable by the one or more processors are to further cause the system to: store first anonymized data and second anonymized data, the first anonymized data isolated from the second anonymized data, and wherein the first privacy-compliant dataset includes at least data from the first anonymized data and the second privacy-compliant dataset includes at least data from the second anonymized data.

Clause 9. The system according to any one or more of the preceding clauses, wherein selecting the at least one digital content from the plurality of digital content is based on the first and second scores.

Clause 10. The system of claim 5, wherein the first score is a first propensity score between 0 and 1 and the second score is a second propensity score between 0 and 1.

Clause 11. The system of claim 5, wherein the first ML model is based on an untrained ML model provided by an entity providing a service to select the at least one digital content, the untrained ML model comprising adjustable input features.

Clause 12. The system according to any one or more of the preceding clauses, wherein the first and second ML models are associated with a programmatic digital content service comprising at least a real-time bidding engine to host the first and second ML models, the programmatic digital content service further comprising a data management layer to ingress the dataset comprising the user data and the digital content data.

Clause 13. A non-transitory computer-readable storage medium storing thereon executable instructions that, as a result of being executed by one or more processors of a computer system, cause the computer system to: host a first machine learning (ML) model and a second ML model, the first ML model trained using a first privacy-compliant dataset and the second ML model trained using a second privacy-compliant dataset, the first privacy-compliant dataset associated with a first entity that is distinct from a second entity associated with the second-privacy-compliant dataset or the first ML model comprises embedded proprietary parameters caused to be obfuscated by the first entity to prevent the second entity from accessing the proprietary parameters; obtain a digital content request including a dataset comprising user data and digital content data; process the dataset using the first ML model to generate a first score representing a first probability of a user engaging digital content; process the dataset using the second ML model to generate a second score representing a second probability of a user engaging digital content; and select at least one digital content from a plurality of digital content based on one or more of the first and second scores.

Clause 14. The non-transitory computer-readable storage medium according to any one or more of the preceding clauses, wherein the first ML model is provided by the first entity and the second ML model is provided by the second entity, the second entity providing a service to host the first ML model provided by the first entity, the service provided by the second entity further provided to receive the dataset and cause the first and second ML models to process the dataset.

Clause 15. The non-transitory computer-readable storage medium according to any one or more of the preceding clauses, wherein the user data and the digital content data comprise real-time data triggered when a digital content opportunity occurs on a computing device of the user, the user data comprising anonymized information about the user and the digital content data comprising digital content inventory information including placement type and size for the at least one digital content, the real-time data further comprising contextual information associated with media that will present the at least one digital content and device information comprising at least an operating system of the computing device.

Clause 16. The non-transitory computer-readable storage medium according to any one or more of the preceding clauses, wherein the instructions, as a result of being executed by the one or more processors, further cause the computer system to: store first anonymized data and second anonymized data, the first anonymized data isolated from the second anonymized data, and wherein the first privacy-compliant dataset includes at least data from the first anonymized data and the second privacy-compliant dataset includes at least data from the second anonymized data.

Clause 17. The non-transitory computer-readable storage medium according to any one or more of the preceding clauses, wherein selecting the at least one digital content from the plurality of digital content is based the first and second scores.

Clause 18. The non-transitory computer-readable storage medium according to any one or more of the preceding clauses, wherein the first score is a first propensity score between 0 and 1 and the second score is a second propensity score between 0 and 1.

Clause 19. The non-transitory computer-readable storage medium according to any one or more of the preceding clauses, wherein the first ML model is based on an untrained ML model provided by an entity providing a service to select the at least one digital content, the untrained ML model comprising adjustable input features.

Clause 20. The non-transitory computer-readable storage medium according to any one or more of the preceding clauses, wherein the first and second ML models are associated with a programmatic digital content service comprising at least a real-time bidding engine to host the first and second ML models, the programmatic digital content service further comprising a data management layer to ingress the dataset comprising the user data and the digital content data.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   providing a data clean room to host first data from an external entity and second data of an entity that provides the data clean room, the data clean room configured to anonymize the first and second data to generate first anonymized data and second anonymized data, the data clean room further configured to at least restrict reading the first data and the second data based on one or more predefined permissions associated with the data clean room;
   providing a service to host at least a first trained machine learning (ML) model and a second trained ML model, the first ML model trained using user data, digital content data, and contextual data determined by the external entity and at least partially comprised in the first anonymized data and the second trained ML model trained using user data, digital content data, and contextual data determined by the entity and at least partially comprised in the second anonymized data;
   obtaining a digital content request triggered based on a digital content opportunity on a computing device, the digital content request comprising an information dataset including information associated with the computing device, anonymized user information, and contextual information;
   processing the information dataset using the first trained ML model to generate a first propensity score representing a first probability of a user engaging digital content;
   processing the information dataset using the second trained ML model to generate a second propensity score representing a second probability of a user engaging digital content; and
   based, at least in part, on one or more of the first and second propensity scores, selecting at least one digital content from a plurality of digital content to display on the computing device.

2. The computer-implemented method of claim 1, wherein selecting the at least one digital content is based on the first and second propensity scores.

3. The computer-implemented method of claim 1, wherein the external entity is a first company and the entity is a second company, the second company providing a demand side service to make a bid, on behalf of the first company, to display the at least one digital content on the computing device.

4. The computer-implemented method of claim 1, wherein the second trained ML model is based on an untrained ML model provided by the entity, the untrained ML model comprising adjustable input features comprising one or more of user demographics, digital content format, user browsing history, device type, or historical click through rate (CTR).

5. A system, comprising:
one or more processors;
memory that stores computer-executable instructions that are executable by the one or more processors to cause the system to:
cause, via access to a data clean room, generation of a first privacy-compliant dataset associated with a first entity and a second privacy-compliant dataset associated with a second entity based at least in part on first data associated with the first entity and second data associated with the second entity, wherein the data clean room includes one or more permissions that restrict whether at least one of the first entity or the second entity may perform one or more operations using at least a portion of the first data or at least a portion of the second data via the data clean room;
host a first machine learning (ML) model and a second ML model, the first ML model trained using the first privacy-compliant dataset and the second ML model trained using the second privacy-compliant dataset, the first privacy-compliant dataset associated with a first entity that is distinct from a second entity associated with the second privacy compliant dataset or the first ML model comprises embedded proprietary parameters caused to be obfuscated by the first entity to prevent the second entity from accessing the proprietary parameters;
obtain a digital content request including a dataset comprising user data and digital content data;
process the dataset using the first ML model to generate a first score representing a first probability of a user engaging digital content;
process the dataset using the second ML model to generate a second score representing a second probability of a user engaging digital content; and
select at least one digital content from a plurality of digital content based on one or more of the first and second scores.

6. The system of claim 5, wherein the first ML model is provided by the first entity and the second ML model is provided by the second entity, the second entity providing a service to host the first ML model provided by the first entity, the service provided by the second entity further provided to receive the dataset and cause the first and second ML models to process the dataset.

7. The system of claim 5, wherein the user data and the digital content data comprise real-time data triggered when a digital content opportunity occurs on a computing device of the user, the user data comprising anonymized information about the user and the digital content data comprising digital content inventory information including placement type and size for the at least one digital content, the real-time data further comprising contextual information associated with media that will present the at least one digital content and device information comprising at least an operating system of the computing device.

8. The system of claim 5, wherein the memory that stores the computer executable instructions that are executable by the one or more processors are to further cause the system to:
store first anonymized data and second anonymized data, the first anonymized data isolated from the second anonymized data, and wherein the first privacy-compliant dataset includes at least data from the first anonymized data and the second privacy-compliant dataset includes at least data from the second anonymized data.

9. The system of claim 5, wherein selecting the at least one digital content from the plurality of digital content is based on the first and second scores.

10. The system of claim 5, wherein the first score is a first propensity score between 0 and 1 and the second score is a second propensity score between 0 and 1.

11. The system of claim 5, wherein the first ML model is based on an untrained ML model provided by an entity providing a service to select the at least one digital content, the untrained ML model comprising adjustable input features.

12. The system of claim 5, wherein the first and second ML models are associated with a programmatic digital content service comprising at least a real-time bidding engine to host the first and second ML models, the programmatic digital content service further comprising a data management layer to ingress the dataset comprising the user data and the digital content data.

13. A non-transitory computer-readable storage medium storing thereon executable instructions that, as a result of being executed by one or more processors of a computer system, cause the computer system to:
cause, via access to a data clean room, generation of a first privacy-compliant dataset associated with a first entity and a second privacy-compliant dataset associated with a second entity based at least in part on first data associated with the first entity and second data associated with the second entity, wherein the data clean room includes one or more permissions that restrict whether at least one of the first entity or the second entity may perform one or more operations using at least a portion of the first data or at least a portion of the second data via the data clean room;
host a first machine learning (ML) model and a second ML model, the first ML model trained using the first privacy-compliant dataset and the second ML model trained using the second privacy-compliant dataset, the first privacy-compliant dataset associated with a first entity that is distinct from a second entity associated with the second privacy-compliant dataset or the first ML model comprises embedded proprietary parameters caused to be obfuscated by the first entity to prevent the second entity from accessing the proprietary parameters;
obtain a digital content request including a dataset comprising user data and digital content data;
process the dataset using the first ML model to generate a first score representing a first probability of a user engaging digital content;
process the dataset using the second ML model to generate a second score representing a second probability of a user engaging digital content; and
select at least one digital content from a plurality of digital content based on one or more of the first and second scores.

14. The non-transitory computer-readable storage medium of claim 13, wherein the first ML model is provided by the first entity and the second ML model is provided by the second entity, the second entity providing a service to host the first ML model provided by the first entity, the service provided by the second entity further provided to receive the dataset and cause the first and second ML models to process the dataset.

15. The non-transitory computer-readable storage medium of claim 13, wherein the user data and the digital content data comprise real-time data triggered when a digital content opportunity occurs on a computing device of the user, the user data comprising anonymized information about the user and the digital content data comprising digital content inventory information including placement type and size for the at least one digital content, the real-time data further comprising contextual information associated with media that will present the at least one digital content and device information comprising at least an operating system of the computing device.

16. The non-transitory computer-readable storage medium of claim 13, wherein the instructions, as a result of being executed by the one or more processors, further cause the computer system to:

store first anonymized data and second anonymized data, the first anonymized data isolated from the second anonymized data, and wherein the first privacy-compliant dataset includes at least data from the first anonymized data and the second privacy-compliant dataset includes at least data from the second anonymized data.

17. The non-transitory computer-readable storage medium of claim 13, wherein selecting the at least one digital content from the plurality of digital content is based the first and second scores.

18. The non-transitory computer-readable storage medium of claim 13, wherein the first score is a first propensity score between 0 and 1 and the second score is a second propensity score between 0 and 1.

19. The non-transitory computer-readable storage medium of claim 13, wherein the first ML model is based on an untrained ML model provided by an entity providing a service to select the at least one digital content, the untrained ML model comprising adjustable input features.

20. The non-transitory computer-readable storage medium of claim 13, wherein the first and second ML models are associated with a programmatic digital content service comprising at least a real-time bidding engine to host the first and second ML models, the programmatic digital content service further comprising a data management layer to ingress the dataset comprising the user data and the digital content data.

* * * * *